(12) United States Patent
Kainen

(10) Patent No.: US 8,690,183 B2
(45) Date of Patent: Apr. 8, 2014

(54) DISPOSABLE SHOPPING CART

(71) Applicant: Elan Kainen, Miami, FL (US)

(72) Inventor: Elan Kainen, Miami, FL (US)

( * ) Notice: Subject to any disclaimer, the term of this patent is extended or adjusted under 35 U.S.C. 154(b) by 0 days.

(21) Appl. No.: 14/042,815

(22) Filed: Oct. 1, 2013

(65) Prior Publication Data

US 2014/0027991 A1    Jan. 30, 2014

(51) Int. Cl.
*B62B 1/00* (2006.01)

(52) U.S. Cl.
USPC ......... 280/651; 280/654; 280/638; 280/47.18

(58) Field of Classification Search
USPC ........ 280/651, 654, 638, 47.18, 47.17, 47.19, 280/47.2, 47.24, 47.26, 47.28, 63, 79.2, 280/DIG. 6
See application file for complete search history.

(56) References Cited

U.S. PATENT DOCUMENTS

| | | | | |
|---|---|---|---|---|
| 3,279,811 A * | 10/1966 | Mitty et al. | | 280/47.26 |
| 3,423,101 A * | 1/1969 | Boeye | | 280/46 |
| 3,462,171 A * | 8/1969 | Mitty et al. | | 280/47.26 |
| 3,519,190 A * | 7/1970 | Achermann et al. | | 206/599 |
| 4,503,973 A * | 3/1985 | Andersson | | 206/386 |
| 4,711,067 A * | 12/1987 | Magni | | 53/439 |
| 5,092,615 A * | 3/1992 | Gregalis | | 280/30 |
| 5,443,168 A * | 8/1995 | Dyment et al. | | 211/149 |
| 5,934,041 A * | 8/1999 | Rudolf et al. | | 53/118 |
| 6,098,378 A * | 8/2000 | Wyatt | | 53/430 |
| 6,105,980 A * | 8/2000 | Cino et al. | | 280/33.998 |
| 6,739,107 B1 * | 5/2004 | Lewis et al. | | 53/118 |

* cited by examiner

*Primary Examiner* — John Walters
*Assistant Examiner* — James Triggs
(74) *Attorney, Agent, or Firm* — Lott & Fischer, PL

(57) ABSTRACT

A shopping cart composed of biodegradable elements to allow for reusability and easy disposability. The frame of the cart is comprised of interconnected elements to create a sturdy and durable structure. The basket forms in the interior of the frame and is also composed of biodegradable material. The wheels are connected to the frame through a wheel bolt, and both the wheel and wheel bolt are also composed of biodegradable material.

15 Claims, 5 Drawing Sheets

DISPOSABLE SHOPPING CART

FIELD OF INVENTION

The present invention relates generally to biodegradable products and specifically to a disposable and reusable shopping cart for enabling multiple items to be pushed while shopping.

BACKGROUND OF THE INVENTION

Presently, shopping carts are an on-going cost to the shops that utilize them. Shopping carts tend to disappear from the shops that utilize them due to either abandonment or theft. The replenishment of shopping cart reserves may be potentially costly to the shops, based on the relatively high price of carts (approximately $75-$200). Additionally, current shopping carts have rigid dimensions that make modifications difficult.

The present invention relates to a disposabte and reusable shopping cart that is not limited to one standard size, make or model. The present invention is largely biodegradable and is meant to be disposable after a limited life cycle. Due to the economics of the manufacture and production of the present invention, the present invention is more cost effective than current shopping carts.

SUMMARY OF THE INVENTION

Disclosed herein are various embodiments of a disposable and reusable shopping cart. The various embodiments are differentiated by the ability to modify the size, make, or model of the present invention. In most embodiments, the present invention includes a top frame and a bottom frame, each crafted from a plurality of cardboard shafts that are positioned relative to each other and connected by a plurality of longitudinal cardboard shafts, forming the frame of the shopping cart. All joints are comprised of a waterproof adhesive. Each of the cardboard shafts is treated with a waterproofing agent that provides strong, durable, waterproof support. Each of the longitudinal shafts is also connected to a cardboard wheel by a cardboard bolt enabling the shopping cart to roll as needed.

DETAILED DESCRIPTION OF THE INVENTION

Figure 1:
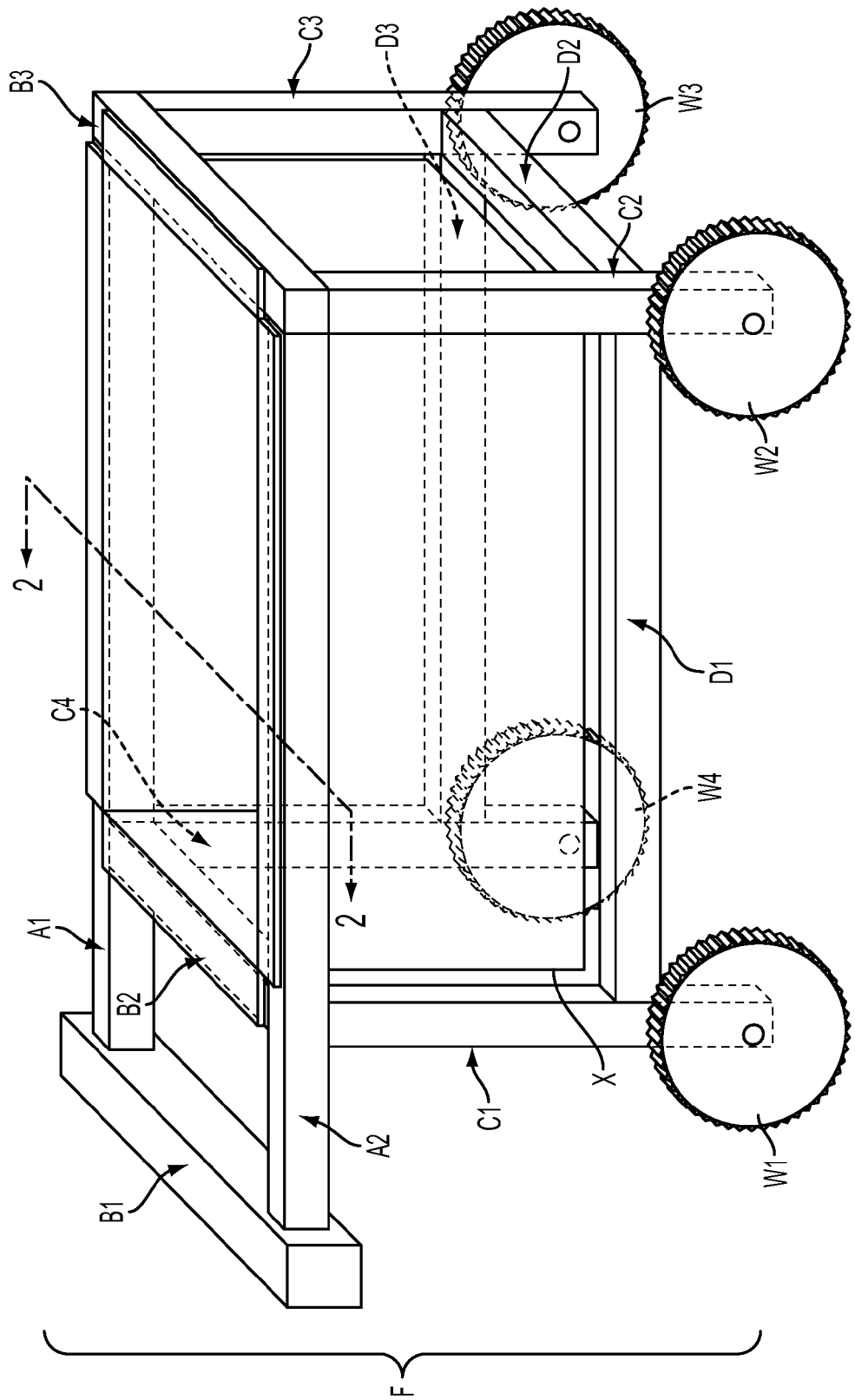
FIG. 1 is a perspective view of an embodiment of the present invention.

With reference to FIG. 1, shown is one embodiment of the present invention. As shown, the shopping cart comprises a frame F, a basket X, and four wheels W1, W2, W3, W4. All components are made from a biodegradable, yet durable material, such as honeycomb cardboard, fiberboard, paperboard, or some other suitable material. Each component is coated, impregnated, or otherwise treated with a thermoplastic material, such as polyethylene terephthalate or high density polyethylene, to provide strong, durable, waterproof support.

In this embodiment, the frame F consists of twelve interlocking biodegradable elements: top left A1, top right A2, top handle B1, top middle B2, top front B3, four longitudinal vertically affixed shafts C1 C2 C3 C4, bottom right D1, bottom front D2, and bottom left D3. In the preferred embodiment, the top handle B1, top middle B2, top front B3, and the four longitudinal vertically affixed shafts C1 C2 C3 C4 elements have rectangular cross-sections, and the top left A1, top right A2, bottom right D1, bottom front D2, and bottom left D3 elements have circular cross-sections.

Alternative embodiments may have different cross-sections assigned to the various elements, including oval, elliptical and polygonal. In different embodiments, the frame may consist of more or less biodegradable elements based on desired stability and functionality of the shopping cart.

To form the frame, the top right A1 and top left A2 elements are laid parallel to each other and connected by top handle element 81 at their proximal ends and top front element 83 at their terminal ends. The top middle element B2 is placed parallel to the top handle R1 and top front elements 83, at a medial point between the ends of A1 and A2 thus defining the opening length for basket X. The distance between the elements may be altered to serve the desired purpose of the shopping cart. All connections are to be adhered by a suitable waterproof adhesive such as Titebond III® waterproof glue or other similar products such as Elmer's Wood glue Max or Gorilla Glue.

The bottom of the frame is created by placing the bottom right D3 and bottom left D1 elements parallel to each other. The two elements both attach at their terminal end to the bottom front element D2. The distance between the bottom right D3 and bottom left element D1 is variable based on the desired stability and size of the shopping cart. As with the top of the frame, all connections are to be adhered by a suitable waterproof adhesive.

In the described embodiment, the top and bottom portion of the frame occupy parallel horizontal planes. The portions are connected by four longitudinal elements C1 C2 C3 C4 that extend down from the top portion to the bottom portion. In the present embodiment, the four longitudinal elements C1 C2 C3 C4 are equally separated apart to maximize stability, but in other embodiments the spacing between the longitudinal elements C1 C2 C3 C4, and the number of longitudinal elements may vary. The bottom portion of the frame should be adhered to the longitudinal elements C1 C2 C3 C4 in a manner that allows the longitudinal elements C1 C2 C3 C4 to extend beyond the bottom portion of the frame. This extra portion along the longitudinal elements C1 C2 C3 C4 is to be utilized to allow wheels to be attached to the ends of the longitudinal elements C1 C2 C3 C4. As with above, all connections are to be adhered by a waterproof adhesive.

Figure 5:
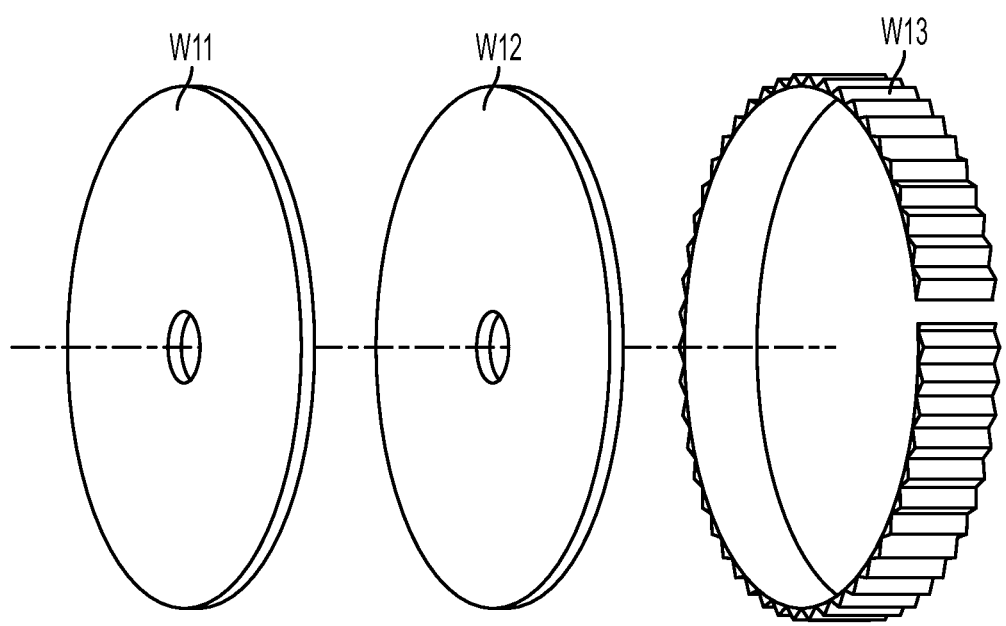
FIG. 5 is an exploded view of a wheel of the present invention.

Four wheels W1 W2 W3 W4 are provided at the base of the four longitudinal elements C1 C2 C3 C4. As shown in FIG. 5, the wheels are comprised of two identical circular discs W11, W12 of biodegradable material, such as the material used to form the frame. The two circular faces of the wheels are adhered to each other with a waterproof adhesive, such as such as the adhesives designated above. A strip of corrugated biodegradable material W13 the length of the circumference of the circular biodegradable materials is wrapped around, and adhered to, the circumference of the attached circular faces W11, W12 with a waterproof adhesive. As with all of the elements of the frame, the entire wheel, including the corrugated material is to be treated with a thermoplastic material.

Figure 3:
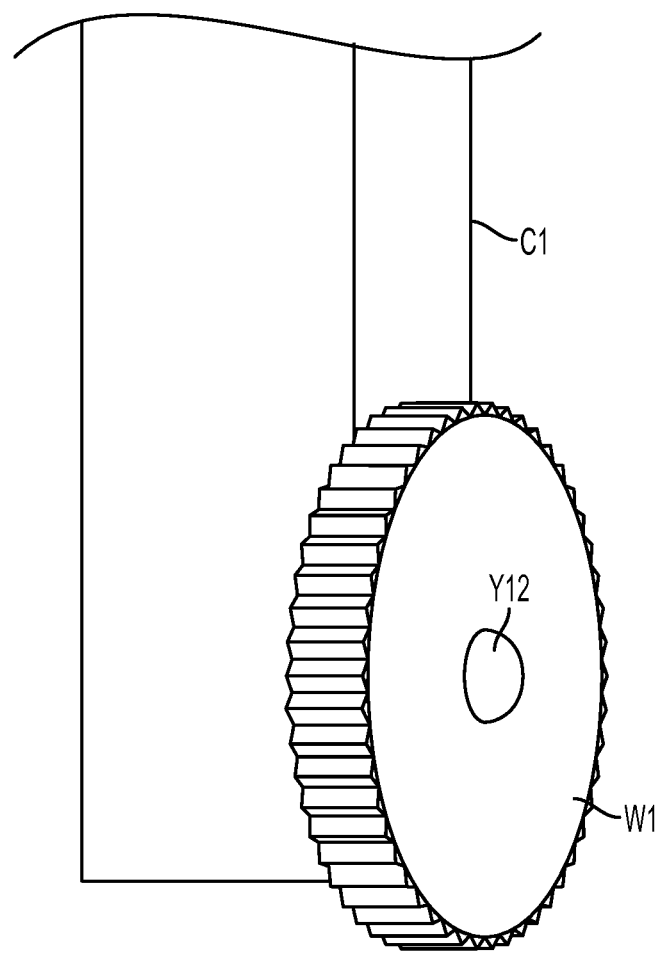
FIG. 3 is a perspective view of a wheel attachment of the present invention.
Figure 4:
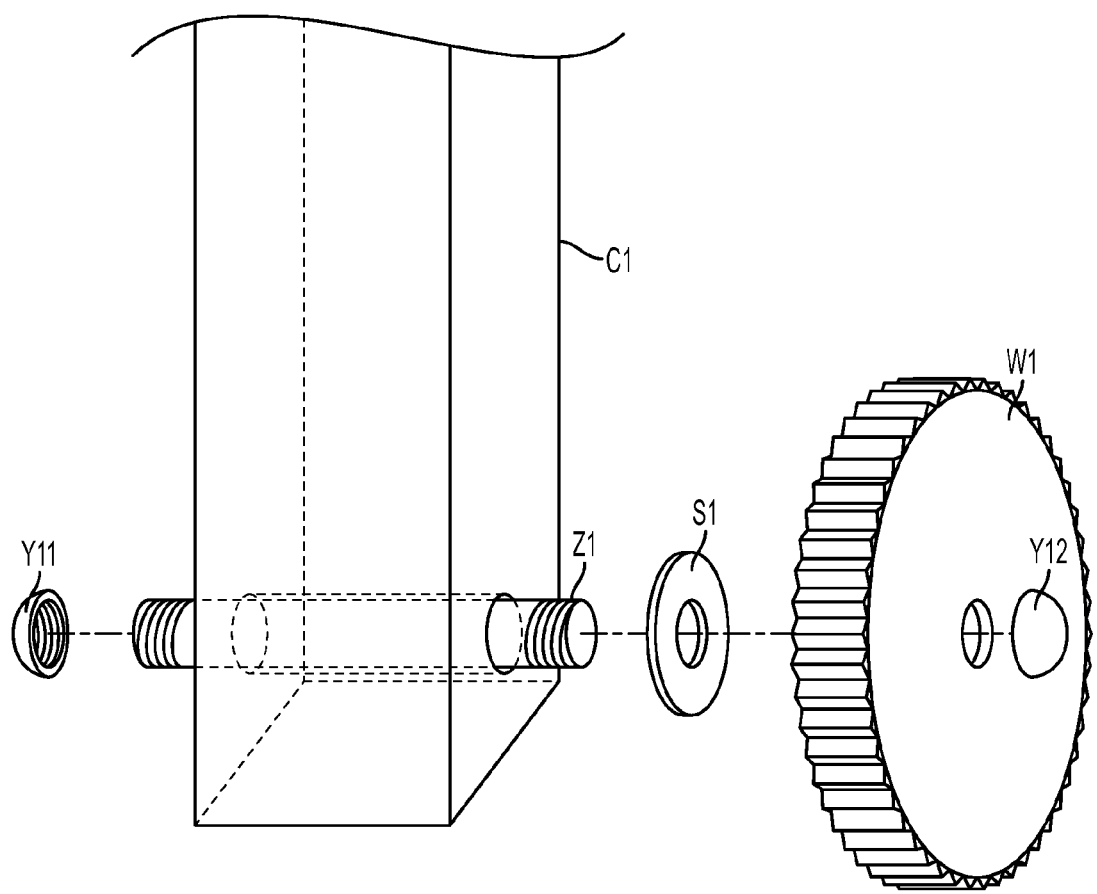
FIG. 4 is an exploded view of a wheel attachment of the present invention.

As shown in FIGS. 3 and 4 the bottom of each longitudinal element C1 C2 C3 C4 is provided with a wheel axis hole. A Wheel bolt Z1 is provided to attach each wheel W1 to each longitudinal element C1. Each wheel bolt is treated with a thermoplastic material similar to that discussed in connection with the other parts. The wheel bolt will go through the longitudinal element and have a portion of the wheel bolt, sticking out from both sides of the longitudinal element. In one embodiment, the wheel bolt will have a biodegradable spacer S1 placed on the wheel bolt, against the outer side of the longitudinal element. The spacer helps ensure that the wheel does not rub against the longitudinal element. The remainder of the outer side wheel bolt will go through a small hole in the center of each wheel. In this embodiment, the wheel bolt protrudes out of the wheel. The extended portions of the wheel bolt, both outer portion through the wheel and the inner portion, are capped by a thicker piece of biodegradable material that covers each end of the wheel bolt Z1, forming a wheel bolt cap Y11 Y12. The wheel bolt caps Y11 Y12 are glued to the ends of the wheel bolts Z1 with a waterproof adhesive. The wheel bolt caps Y11 Y12 ensure that the wheel bolt does not come out of place, dislodging the wheel. In another embodiment of the shopping cart, the wheel may be placed on the inner side of the longitudinal shaft, rather than on the outer side.

Figure 2:
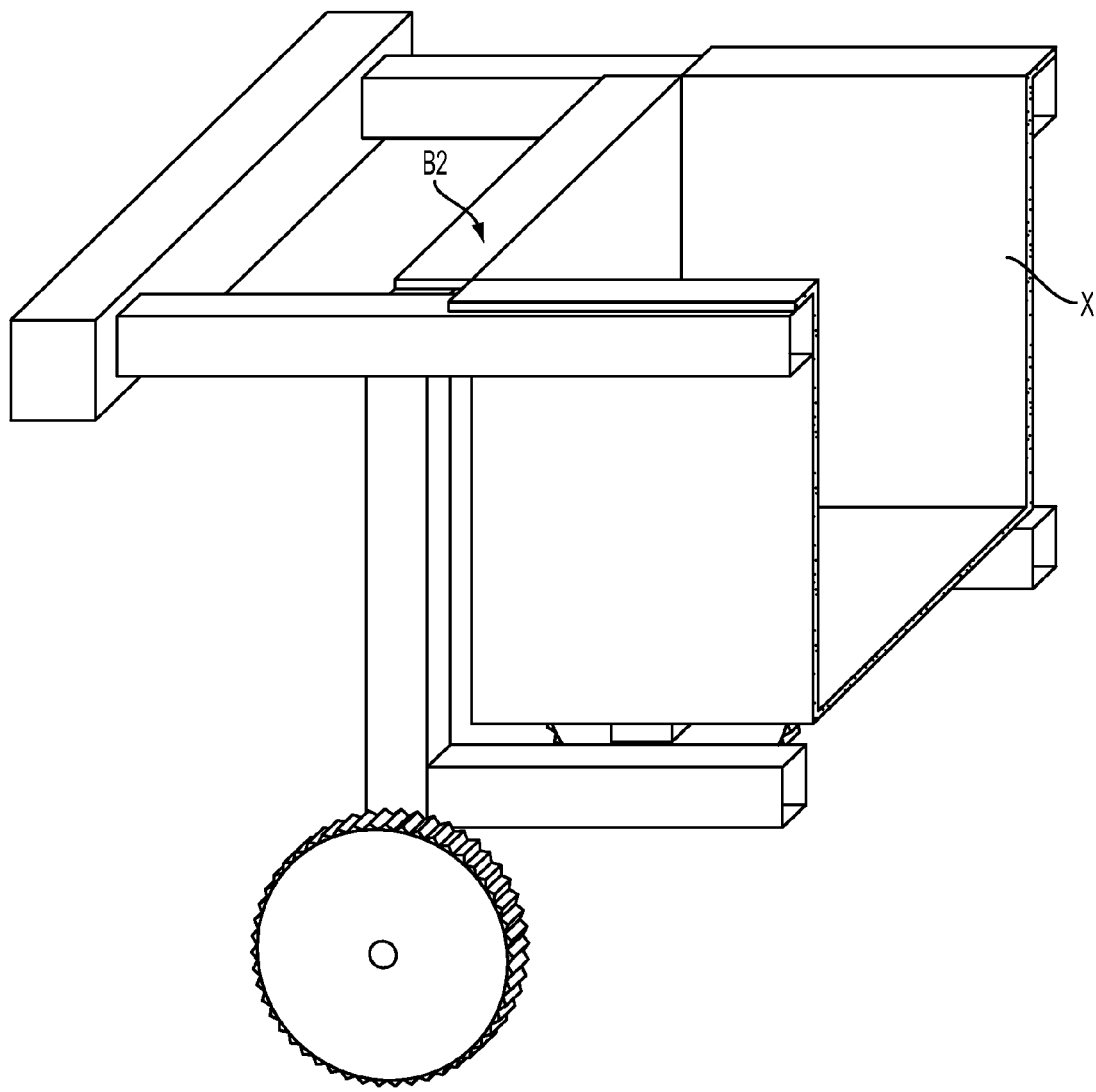
FIG. 2 is a detailed view illustrating the attachment of a basket to a frame in an embodiment of the present invention.

With reference to FIG. 2, the basket X is formed from a biodegradable material, similar to the material used for the frame, such as honeycomb cardboard, fiberboard, or paperboard. The basket is generally shaped like an open-topped box and is suspended along the interior sides of the op middle B2, top right A1 top A2, and top front elements B3. A preformed lip along the edges of the basket will be glued with a waterproof adhesive, similar to the adhesive described above, to the interior sides of the elements. The lip along the edges of the basket will allow the basket to suspend into the frame of the shopping cart. In this embodiment, the basket will generally form a hexahedron with the top side open. Other possible embodiments of the basket include interwoven strips of biodegradable material that form a web, or biodegradable fabric netting, such as cotton, may be used as the basket.

The invention claimed is:

1. A cart, comprising:
a frame, a basket, and four wheels;
wherein said frame comprising a top portion and a bottom potion;
wherein said top portion comprising five biodegradable elements, a top left element, top right element, top handle element, top middle element, and top bottom element;
wherein the top left element and top right element are parallel to each other, and the top handle element, top middle element, and top front element are set perpendicular to the top left element and top right element, yet parallel to each other;
wherein the top left element and top right element are attached at their back ends to the top handle element and at their front ends to the top front element by a waterproof adhesive, and the top middle element is adhered between the top left element and the top right element a certain distance between the top handle element and the top front element;
wherein said bottom portion comprising three biodegradable elements, a bottom left element, a bottom right element, and a bottom front element;
wherein said bottom left element and said bottom right element are affixed parallel to each other and perpendicular to the bottom front element, and the bottom front element is adhered to the bottom left element and bottom right element with a waterproof adhesive;
wherein the top portion and bottom portion of the frame exist in parallel horizontal planes;
wherein four vertically affixed biodegradable elements are adhered at their beginning end to the to portion, extend downwards from the top portion to the bottom portion and are adhered to the bottom portion, and at least a portion of the vertically affixed elements extend beyond the bottom portion;
wherein the wheels are comprised of two circular biodegradable elements with a hole in the middle, and the two circular elements are adhered to each other by a waterproof adhesive;
wherein the circumference of each wheel is covered with a corrugated biodegradable element, and said corrugated element is adhered to the circumference of each wheel by a waterproof adhesive;
wherein a wheel bolt is comprised of a biodegradable element and a wheel bolt cap is comprised of a thicker piece of biodegradable material;
wherein each wheel is attached to a vertically affixed element by a wheel bolt, where the wheel bolt protrudes through a small hole towards the bottom of the longitudinal element and then through the hole in the wheel, the ends of the wheel bolt that protrude from the longitudinal element and the wheel are to be capped by a wheel bolt cap, and the wheel bolt cap is adhered to the ends of the wheel bolt by a waterproof adhesive;
wherein the basket is formed by placing a hexahedron biodegradable element with no top side into the gap created by the top left, top right, top middle, and top front elements;
wherein the hexahedron element is attached to the top left, top right, top middle, and top front elements by bending back the sides of the hexahedron element to cover the top left, toy right, top middle, and top front elements and adhering the polled back portion of the hexahedron element to the top left, top right, top middle, and top front elements with a waterproof adhesive;
wherein all components and elements are treated with a thermoplastic material.

2. The cart of claim 1, wherein said wheels are located on the interior.

3. The cart of claim 1, wherein said basket comprises of a biodegradable fabric.

4. The cart of claim 1, wherein said basket comprises of a biodegradable mesh.

5. The cart of claim 1, wherein said basket comprises plurality of interwoven biodegradable elements.

6. The cart of claim 1, wherein the frame comprises a two or more longitudinal shafts.

7. The cart of claim 1, wherein the top portion of the frame comprises a plurality of elements.

8. The cart of claim 1, wherein the bottom portion of the frame comprises a plurality of elements.

9. The cart of claim 1, wherein the cart comprises a plurality of wheels.

10. The cart of claim 1, wherein the basket comprises elements composed of biodegradable fabric.

11. The cart of claim 1, wherein all of the elements are a multitude of sizes.

12. The cart of claim 1, wherein a biodegradable spacer is placed between the wheel and the vertically affixed elements.

13. The cart of claim 1, wherein the biodegradable elements have a tubular shape.

14. The cart of claim 1, wherein the biodegradable elements have a rectangular shape.

15. The cart of claim 1, wherein the biodegradable elements have a plurality of shapes.

\* \* \* \* \*